United States Patent [19]

Fielding et al.

[11] 4,082,716
[45] Apr. 4, 1978

[54] HIGH IMPACT POLYPROPYLENE RESINS CONTAINING PHTHALIDE

[75] Inventors: Ivor R. Fielding, Naperville; Wassily Poppe, Lombard, both of Ill.

[73] Assignee: Standard Oil Company (Indiana), Chicago, Ill.

[21] Appl. No.: 652,878

[22] Filed: Jan. 27, 1976

[51] Int. Cl.² .................. C08K 5/09; C08L 23/12; C08L 23/14

[52] U.S. Cl. .................. 260/30.4 R; 260/897 A; 526/351

[58] Field of Search ............ 260/30.4 R, 897 A; 526/351

[56] References Cited

U.S. PATENT DOCUMENTS

| | | | |
|---|---|---|---|
| 1,941,474 | 1/1934 | Jaeger | 106/22 |
| 2,925,410 | 2/1960 | Coover | 260/93.7 |
| 3,470,127 | 9/1969 | Snell et al. | 260/33.6 |
| 3,872,052 | 3/1975 | Fielding et al. | 260/42.46 |
| 3,941,859 | 3/1976 | Batiuk et al. | 260/897 B |

*Primary Examiner*—Stanford M. Levin
*Attorney, Agent, or Firm*—William H. Magidson; Arthur G. Gilkes; William T. McClain

[57] ABSTRACT

Polypropylene composition having improved impact and flow properties containing phthalide.

10 Claims, No Drawings

HIGH IMPACT POLYPROPYLENE RESINS CONTAINING PHTHALIDE

This invention relates to compositions comprising resinous polymers of propylene and phthalide.

Resinous polymers of propylene have been used extensively in the fabrication of molded parts. However, it is generally recognized that these polymers are relatively flexible and lack the stiffness desired in some end uses, particularly where the fabricated parts are subjected to a relatively high temperature. For example, most automobile battery cases and motor housings are subject to high temperatures during operation of the associated heat sources. This lack of stiffness is reflected in the relatively low flexural modulus of resinous polymers of propylene.

At the same time, these polymers, particularly homopolymeric polypropylene tend to lack impact resistance, i.e., molded parts break when they are dropped or when a heavy object is dropped on the molded parts. In substance these polymers lack stiffness and are brittle. This brittleness is reflected in their low notched Izod impact value at room temperature. To provide better impact resistance, it is common to use propylene copolymers with ethylene and/or other monomers. Unfortunately, these copolymers have substantially less stiffness than homopolymeric polypropylene. Attempts to improve impact resistance by compounding the propylene homopolymers and copolymers with ethylene-propylene rubbers (including diene modifications) has led to improved impact resistance but lower stiffness and various compromises in the polypropylene composition due to flow rate considerations. In general, the lower the flow rate of the polypropylene, the better the impact properties. However, additions of rubber decrease the flow rate of polypropylene. If the flow rate of the polypropylene composition is too low, it is difficult to mold the resin. Accordingly, when ethylene-propylene rubbers or ethylene-propylene-diene rubbers are employed, it is not possible to take advantage of the impact properties of the lower flow rate resinous polymers of propylene.

The general object of this invention is to provide compositions comprising resinous polymers of propylene having improved impact resistance. A more specific object of this invention is to provide homopolymeric polypropylene compositions having improved impact resistance. Other objects appear hereinafter.

We have now found that the objects of this invention can be attained by compounding resinous polymers of propylene with low levels of phthalide. The phthalide alone or in conjunction with rubbers increases the impact and flow properties of resinous polymers or propylene. Unlike various other additives, such as acicular hydrated sodium aluminum carbonate (Dawsonite) described in U.S. Pat. No. 3,872,052, it is possible to employ resinous polymers of propylene having relatively low flow rates and take advantage of the better impact properties of the low flow rate resinous polymers of propylene.

For the purposes of this invention, the term "resinous polymer of propylene" includes polymers containing at least 75% by weight propylene, such as substantially crystalline homopolymeric polypropylene, propylene-ethylene block, random or multi-segment copolymers containing up to 25% by weight ethylene units in the polymer, etc.

Phthalide can be used in a concentration of about 0.5–15 parts by weight, per each 100 parts by weight resinous polymer of propylene. In general, higher concentrations of phthalide are undesirable since as the concentration of phthalide increases above 6 parts by weight per 100 parts by weight total resin (resinous polymer of propylene and any rubber modifier), there is a tendency for smoking during extrusion at the die of extruders and discoloration of the resinous polymers becomes noticeable due to the slight tan color of phthalide. Above about 10 parts by weight phthalide per 100 parts by weight total resin the discoloration and smoking becomes undesirable and phthalide's odor becomes prominent. Within the preferred range of 1.5 to 10 parts by weight phthalide per 100 parts by weight resin, the odor is no more objectionable during extrusion than the odor of resinous polymers of propylene without phthalide. However, above about 10 parts by weight, the odor may be aesthetically objectionable to some people.

The compositions of this invention can contain various conventional additives. Various impact modifiers, such as ethylene-propylene rubbers containing at least 40% by weight ethylene, can be used in a concentration of 0 to 50 parts by weight per 100 parts by weight resinous polymer of propylene. Pigments, such as titanium dioxide, stabilizers, fire-retardants, etc., can also be used.

The following examples are merely illustrative.

EXAMPLE I

Crystalline homopolymeric polypropylene having a weight average molecular weight of about 700,000 containing either no phthalide or 1 part by weight phthalide per each 24 parts by weight stabilized polypropylene were extruded on a 1 inch pelletizing screw extruder having a ⅛ inch strand die maintained at a temperature of 425° F. The samples were tested and the results are set forth below in Table I.

Table I

|  | Control | Phthalate Present |
|---|---|---|
| Flow Rate (grams/10 minutes) | 3.2 | 3.9 |
| Izod Impact Strength (ft-lb/in., ⅛ in. bar) | | |
| Notched at 73° F | 0.53 | 0.85 |
| Notched at 0° F | 0.29 | 0.27 |
| Notched at −20° F | 0.28 | 0.28 |
| Unnotched at 73° F | no break | 28.65 |
| Unnotched at 0° F | 18.31 | 25.47 |
| Unnotched at −20° F | 10.36 | 21.60 |
| Tensile Impact Strength (ft/lb/in.$^2$) | 53 | 39 |
| Tensile Modulus | 245,000 | 220,000 |
| Tensile Properties | | |
| Yield Tensile Strength (psi) | 5514 | 4924 |
| Ultimate Tensile Strength (psi) | 3314 | 2352 |
| Elongation at Yield (%) | 9.50 | 7.62 |
| Elongation at Break (%) | 177 | 72.6 |
| Flexural Properties (psi) | | |
| Flexural Yield Strength | 5500 | 6100 |
| Flexural Modulus | 176,000 | 190,000 |
| Stiffness | 140,000 | 147,000 |
| Rockwell Hardness | 94R | 92R |
| Heat Deflection Temp. (° F, 66 psi) | 192 | 203 |

The above data indicates that the notched Izod impact at room temperature increases from 0.53 without phthalide up to 0.85 with phthalide in the resin while the flow rate increases from 3.2 up to 3.9. As indicated above the parallel increases in impact and flow properties cannot be underestimated and conventional impact modifiers (EPR or EPDM rubber) show just the opposite effect on flow rate. For this reason it is often difficult to mold flow rate polypropylene resins containing only rubber. It is therefore necessary to use high flow rate polypropylene with rubber modified resins. Therefore, the prior art compositions cannot take advantage of the better impact properties of the lower flow rate polypropylene base stock materials.

EXAMPLE III

This example illustrates that as the concentration of phthalide in polypropylene compositions containing impact modifying rubber increases, both the flow rate and notched Izod impact increased. Example I was repeated using the polypropylene of Example II and an ethylene-propylene-nonconjugated diene rubber. The concentration of the materials and results are set forth below in Table III:

Table III

|  |  |  |  |  |
|---|---|---|---|---|
| Parts by weight Polypropylene | 80 | 76 | 74 | 72 |
| Parts by weight Rubber | 20 | 20 | 20 | 20 |
| Parts by weight Phthalide | 0 | 4 | 6 | 8 |
| Flow Rate (gm/10 min) | 4.0 | 4.4 | 4.7 | 5.0 |
| Izod Impact Strength (ft-lb/in., $\frac{1}{8}$" bar) |  |  |  |  |
| Notched at 73° F | 2.0 | 2.3 | 2.3 | 2.6 |
| Notched at −20° F | 1.0 | 1.0 | 0.99 | 1.0 |
| Unnotched at 73° F | no break | no break | no break | no break |
| Unnotched at −20° F | 20.0 | 21.0 | 17.0 | 18.0 |
| Tensile Properties |  |  |  |  |
| Yield Tensile Strength (psi) | 4040 | 3590 | 3570 | 3410 |
| Ultimate Tensile Strength (psi) | 2340 | 2440 | 2420 | no break |
| Elongation at Yield (%) | 9.61 | 9.8 | 9.07 | 10.4 |
| Elongation at Break (%) | 294. | 370. | 416. | >450 |
| Flexural Modulus (psi) | 153,000 | 128,000 | 143,000 | 140,000 |
| Rockwell Hardness | 79R | 72R | 67R | 65R |
| Heat Deflection Temp. (° F at 66 psi) | 195 | 177 | 183 | 177 |
| Gardner Impact (in. lb. at −20° F) | 120–122 | 71 | 120–124 | 112–116 |

EXAMPLE II

Example I was repeated using crystalline homopolymeric polypropylene having a weight average molecular weight of about 600,000. Weight ratios of polypropylene to phthalide were 24:1; 47:3; and 23:2. The results are set forth below in Table II:

Table II

|  | Control | 24:1 | 47:3 | 23:2 |
|---|---|---|---|---|
| Weight ratio polypropylene to phthalide |  |  |  |  |
| Flow Rate (gm/10 min) | 4.8 | 7.1 | 8.0 | 9.4 |
| Izod Impact Strength (ft-lb/in., $\frac{1}{8}$" bar) |  |  |  |  |
| Notched at 73° F | 0.63 | 0.65 | 0.68 | 0.90 |
| Notched at −20° F | 0.29 | 0.40 | 0.37 | 0.40 |
| Unnotched at 73° F | 23. | 26. | 22. | no break |
| Unnotched at −20° F | 5.7 | 7.3 | 7.2 | 6.5 |
| Tensile Properties |  |  |  |  |
| Yield Tensile Strength (psi) | 5440 | 5010 | 5020 | 4790 |
| Ultimate Tensile Strength (psi) | 3260 | 2670 | 2750 | 2940 |
| Elongation at Yield (%) | 5.34 | 5.23 | 5.36 | 4.4 |
| Elongation at Break (%) | 28. | 80. | 102. | 55. |
| Flexural Modulus (psi) | 232,000 | 199,000 | 205,000 | 197,000 |
| Rockwell Hardness | 101R | 99R | 99R | 96R |
| Heat Deflection Temp. (° F at 66 psi) | 213 | 216 | 226 | 229 |
| Gardner Impact (in. lb. at −20° F) | 1 | 1 | 1 | 2 |

The above data indicates that both the flow rate and notched room temperature Izod impact properties increase as phthalide concentration increases.

EXAMPLE IV

This example illustrates that as the concentration of phthalide in propylene-ethylene copolymer (96/4 by weight) compositions containing impact modifying rubber (ethylene-propylene-conjugated diene rubber) increases, room temperature notched Izod and flow rate both increase. Example I was repeated. The concentration of the materials and results are set forth below in Table IV:

Table IV

|  |  |  |  |  |  |  |  |
|---|---|---|---|---|---|---|---|
| Parts by Weight Copolymer | 85 | 81 | 79 | 77 | 85 | 85 | 85 |
| Parts by Weight Rubber | 15 | 15 | 15 | 15 | 11 | 9 | 7 |
| Parts by Weight Phthalide | 0 | 4 | 6 | 8 | 4 | 6 | 8 |
| Flow Rate (gm/10 min.) | 3.8 | 3.6 | 4.9 | 4.7 | 4.1 | 5.0 | 6.0 |
| Izod Impact Strength (ft-lb/in., $\frac{1}{8}$" bar) |  |  |  |  |  |  |  |
| Notched at 73° F | 2.2 | 2.2 | 2.7 | 3.4 | 1.78 | 1.65 | 1.65 |
| Notched at −20° F | 0.98 | 1.03 | 0.92 | 0.88 | 0.80 | 0.71 | 0.72 |

Table IV-continued

| | | | | | | | |
|---|---|---|---|---|---|---|---|
| Unnotched at 73° F | no break | no break | no break | no break | no break | no break | no break |
| Unnotched at −20° F | 23. | 20. | 20. | 20. | 18. | 33. | 32. |
| Tensile Properties | | | | | | | |
| Yield Tensile Strength (psi) | 3760 | 3600 | 3520 | 3520 | 3850 | 3920 | 3910 |
| Ultimate Tensile Strength (psi) | 2430 | no break | no break | no break | 2390 | 2360 | 2240 |
| Elongation at Yield (%) | 10.9 | 10.2 | 10.5 | 11.0 | 10.1 | 10.3 | 9.05 |
| Elongation at Break (%) | 392. | >450 | >450 | >450 | 295. | 280. | 258. |
| Flexural Modulus (psi) | 149,000 | 131,000 | 131,000 | 137,000 | 140,000 | 144,000 | 148,000 |
| Rockwell Hardness | 77R | 71R | 69R | 68R | 76R | 80R | 80R |
| Heat Deflection Temp. (° F at 66 psi) | 196 | 185 | 194 | 199 | 189 | 196 | 207 |
| Gardner Impact (in-lb at −20° F) | 36 | 46 | 126 | 88 | 80 | 86 | 32 |

EXAMPLE V

This example illustrates that phthalide increases the flow rate and room temperature impact of resinous polymers of propylene compositions containing ethylene-propylene-nonconjugated diene rubber and acicular Dawsonite. Example I was repeated using the polypropylene of Example II. The concentration of materials and results are set forth below in Table V.

Table V

| | | | | |
|---|---|---|---|---|
| Parts by Weight polypropylene | 76 | 72 | 70 | 68 |
| Parts by Weight rubber | 20 | 20 | 20 | 20 |
| Parts by Weight Dawsonite | 4 | 4 | 4 | 4 |
| Parts by Weight Phthalide | 0 | 4 | 6 | 8 |
| Flow Rate (gm/10 min.) | 3.7 | 4.4 | 4.8 | 5.1 |
| Izod Impact Strength (ft-lb/in., ⅛" bar) | | | | |
| Notched at 73° F | 1.81 | 2.8 | 5.7 | 7.1 |
| Notched at −20° F | 0.70 | 0.65 | 0.74 | 0.69 |
| Unnotched at 73° F | no break | no break | no break | no break |
| Unnotched at −20° F | 11. | 9.8 | 10. | 11. |
| Tensile Properties | | | | |
| Yield Tensile Strength (psi) | 4100 | 3830 | 3680 | 3560 |
| Ultimate Tensile Strength (psi) | 2620 | no break | 089 | no break |
| Elongation at Yield (%) | 7.34 | 7.95 | 9.0 | 8.1 |
| Elongation at Break (%) | 25.0 | >450 | 450 | >455 |
| Flexural Modulus (psi) | 247,000 | 223,000 | 207,000 | 203,000 |
| Rockwell Hardness | 72R | 71R | 71R | 70R |
| Heat Deflection Temp. (° F at 66 psi) | 203 | 190 | 193 | 191 |
| Gardner Impact (in lb at −20° F) | 75 | 86 | 86 | 82 |

What is claimed is:

1. A composition having improved impact and flow properties comprising a resinous polymer of propylene containing at least 75 percent by weight propylene and phthalide in a concentration of 0.5 to 15 parts by weight per each 100 parts by weight resinous polymer of propylene.

2. The composition of claim 1, wherein said resinous polymer of propylene comprises a homopolymer of propylene.

3. The composition of claim 2, wherein said composition comprises an impact modifier.

4. The composition of claim 3, wherein said impact modifier comprises an ethylene-propylene rubber and said phthalide is present in a concentration of 1.5 to 10 parts by weight per each 100 parts by weight total resin.

5. The composition of claim 4, wherein said ethylene-propylene rubber is an ethylene-propylene diene rubber.

6. The composition of claim 4, wherein said composition comprises acicular hydrated sodium aluminum carbonate.

7. The composition of claim 1, wherein said resinous polymer of propylene comprises a copolymer of propylene and ethylene containing at least 75% by weight propylene.

8. The composition of claim 6, wherein said composition comprises an impact modifier.

9. The composition of claim 8, wherein said impact modifier comprises an ethylene-propylene rubber.

10. The composition of claim 9, wherein said composition comprises an acicular hydrated sodium aluminum carbonate.

* * * * *

UNITED STATES PATENT OFFICE
CERTIFICATE OF CORRECTION

Patent No. 4,082,716          Dated April 4, 1978

Inventor(s) Ivor R. Fielding and Wassily Poppe

It is certified that error appears in the above-identified patent and that said Letters Patent are hereby corrected as shown below:

Col. 2, line 50 "(ft/lb/in$^2$)" should read -- (ft-lb/in$^2$) --.

Col. 3, line 5 "mold flow rate" should read -- mold low flow rate --.

Col. 5, line 32 "089" should read -- .089 --.

Col. 5, line 38 "25.0" should read -- 250. --.

*Signed and Sealed this*

*Thirty-first* Day of *October 1978*

[SEAL]

Attest:

RUTH C. MASON
*Attesting Officer*

DONALD W. BANNER
*Commissioner of Patents and Trademarks*